United States Patent [19]

Morimura et al.

[11] Patent Number: 5,055,814
[45] Date of Patent: Oct. 8, 1991

[54] DISPLACEMENT DETECTOR

[75] Inventors: Toshiaki Morimura; Norio Daimaru; Akira Wachi, all of Tokyo, Japan

[73] Assignee: Ohkura Electric Co., Ltd., Tokyo, Japan

[21] Appl. No.: 342,349

[22] Filed: Apr. 21, 1989

[30] Foreign Application Priority Data

May 19, 1988 [JP] Japan .............................. 63-65149[U]
Nov. 12, 1988 [JP] Japan ........................... 63-147049[U]

[51] Int. Cl.⁵ ............................................. H01F 21/06
[52] U.S. Cl. ..................................... 336/119; 336/120
[58] Field of Search .............. 336/130, 131, 132, 133, 336/134, 135, 115, 117, 118, 119, 75, 77, 79

[56] References Cited

U.S. PATENT DOCUMENTS

| 3,137,812 | 6/1964 | Andresen | 336/75 |
| 3,173,119 | 3/1965 | Thompson | 336/133 |
| 3,215,962 | 11/1965 | Thompson | 336/135 X |
| 3,864,614 | 2/1975 | Olson | 336/130 X |

FOREIGN PATENT DOCUMENTS

| 122082 | 9/1946 | Australia | 336/130 |
| 2511683 | 9/1976 | Fed. Rep. of Germany . | |
| 60-33369 | 2/1985 | Japan . | |
| 62-3684 | 1/1987 | Japan . | |
| 830056 | 3/1960 | United Kingdom | 336/134 |

*Primary Examiner*—Thomas J. Kozma
*Attorney, Agent, or Firm*—Fleit, Jacobson, Cohn, Price, Holman & Stern

[57] ABSTRACT

The disclosed displacement detector uses a printed circuit board extending through a comparatively uniformly magnetized gap of a core. The core is essentially a closed loop of magnetic material enclosing a hollow space, and a magnetic material leg extends from a portion of the loop to the hollow space so as to define the above-mentioned gap between the extended end of the leg and a side of the loop facing therewith. A first coil is wound on the leg of the core. The printed circuit board has a second coil with a plurality of mutually spaced turns with slant portions, so that linkage of the magnetic flux of the core gap with the second coil varies depending on the relative displacement between the core and the printed circuit board. The slant portion of the second coil can be made symmetrical with respect to a center line parallel to the relative movement between the core and the printed circuit board.

3 Claims, 5 Drawing Sheets

DISPLACEMENT DETECTOR

BACKGROUND OF THE INVENTION

1. Field of the Invention

This invention relates to a displacement detector, and more particularly to a detector which magnetically detects linear or angular displacement in a non-contact fashion and converts the detected displacement into an electric signal. The detector of the invention has a high linearity between its input and output, and one can use it as an excellent control element such as a feedback control element for a robot, a recorder pen and the like.

2. Description of the Prior Art

West German Patent No. 2511683 discloses a typical detector for magnetically detecting a displacement as illustrated in a plan view of FIG. 4A and a side view of FIG. 4B. A core 1 of U-shaped cross section is made of magnetic material with a high permeability, and a magnetizing coil 2 is wound thereon. An alternating-current (AC) power source 16 is connected to magnetizing terminals $D_1$ and $D_2$ of the magnetizing coil 2 for excitation of the core 1. The core 1 has a gap 20 through which a printed circuit board 3 extends, and detecting coil 4a formed on the board 3 crosses the gap 20 so as to cause linkage between the magnetic flux of the gap 20 and the detecting coil 4a. The detecting coil 4a has a number of turns each of which has an edge-like slant portion 4b, so that the linkage between the detecting coil 4a and the magnetic flux of the gap 20 varies depending on the position of the core 1 relative to the printed circuit board 3.

The exciting coil 2 can be wound either on a connecting portion of two legs of the U-shaped core 1 as shown in FIGS. 4B and 4C or on one of the two legs as shown in FIG. 4D. With such U-shaped core 1, reluctance of the gap 20 as seen from the exciting coil 2 is not uniform, and when the core 1 is excited by an AC current from the AC power source 16 the flux density in the gap 20 is not uniform. For instance, if the flux densities in the gap 20 at its closed root portion, at its central portion and at its open end portion are represented by $B_1$, $B_2$ and $B_3$, respectively,. their magnitudes decreases in that order, i.e., $B_1 > B_2 > B_3$. When the core 1 is made of high permeability material, such as ferrite, the ratio of permeability between ferrite and air is in the order of 100:1 and the above non-uniformity of the magnetic flux density in the air gap 20 is not negligible.

The U-shaped core 1 of the prior art has further shortcomings; namely, that it is difficult to mount a winding or coil on such core and a special winding machine is necessary, that the formation of the exciting coil 2 on the core 1 is comparatively difficult, that the gap 20 tends to be made wide for facilitating the winding of the exciting coil 2 and such tendency results in a reduction of the voltage induced in the detecting coil 4a, and that when a foreign magnetic substance is inadvertently brought to the proximity of the open end of the gap 20, the flux density in the gap 20 is disturbed and an error may be caused thereby.

Depending on the AC flux linkage, the detecting coil 4a produces an electric signal e across its output terminals $T_1$ and $T_2$. Since each turn of the detecting coil 4a has the slant portion 4b of edge shape, the above AC flux linkage of the detecting coil 4a depends on relative displacement between the core 1 and the printed circuit board 3. Hence the output signal e represents such relative displacement. More particularly, the mechanical relative displacement X between the core 1 and the board 3 as shown in FIG. 4A is converted into the electric signal e.

In FIG. 4A, if the origin of the coordinate for the displacement X is set at the extreme left end of the detecting coil 4a, and if the slant portions 4b of the adjacent turns of the detecting coil 4a are spaced in succession as shown, the relationship between the displacement X and the output e can be plotted, as shown in the graph of FIG. 5. The symbol 1' of FIG. 4A shows the core 1 at the origin of the coordinate, and the numeral 5 represents an insulating sheet of the printed circuit board 3. The solid straight line OP of FIG. 5 represents linear relation which can be achieved only when the magnetic flux density in the gap 20 of the core 1 is uniform. The vertical height of the solid line OP is proportional to the physical area of interlinkage between the detecting coil 4a and the core 1, and with the edge-shaped slant portions 4b of the detecting coil 4a, the above physical area of interlinkage varies linearly with the relative displacement X. Thus, if the magnetic flux density in the gap 20 of the core 1 is uniform, the linear relationship of the solid line OP can be achieved.

The actual magnetic flux density in the gap 20 is, however, not uniform as pointed out above, and the actual output signal e becomes, for instance, a series of curves 6, 7 and 8 of FIG. 5 which deviate from the solid line OP.

To avoid such non-linearity, a number of methods have been proposed. The gap 20 may be tapered so that it becomes narrower and its reluctance becomes smaller as it extends from the closed end toward the open end, so as to produce a substantially uniform distribution of the magnetic flux density therein. It is, however, difficult to cut the core 1 with the above-mentioned taper, and the tapered gap 20 has not been used.

Japanese Utility Model No. 1634377 (Japanese Utility Model Publication No. 33369/85) discloses a more practical method, which uses a U-shaped core 1 with two long legs and two printed circuit boards 3 disposed in the gap 20 between the two long legs. A first one of the two boards 3 has a detecting core 4a similar to that of FIG. 4A. A second one of the two boards 3 is positioned on one side of the first board 3 in an upside-down fashion and carries a detecting coil 4a' (not shown). The detecting coils 4a and 4a' have an identical shape but they are disposed in the gap 20 in a reversed fashion, and deviation from linear characteristics in the second coil 4a' is in an opposite direction to that in the first detecting coil 4a. The voltage e of the first detecting coil 4a and the voltage e' of the second detecting coil 4a' are added so as to cancel the deviations from the linear characteristics in the two voltages, and the sum (e+e') is used as the output of the displacement detector. Instead of laying the two printed circuit boards 3 side by side, the two boards 3 may be overlaid, one over the other, while disposing the inclinations of the coils 4a, 4a' in reverse directions.

Further, Japanese Utility Model No. 1695217 (Japanese Utility Model Publication No. 3684/87) teaches another solution, which uses a printed circuit board 3 carrying a first and second detecting coils 4a, 4a' (not shown) formed on opposite surfaces thereof respectively. The shape of the first detecting coil 4a is such that its magnetic flux linkage increases with the displacement X, while the second detecting coil 4a' is so shaped that its magnetic flux linkage decreases with the displacement X. Deviation from the linearity is eliminated by taking the sum of the two voltages induced in the first and second detecting coils 4a, 4a'.

The solutions of non-linearity by the above-mentioned utility models, however, have a shortcoming in that formation of the required two detecting coils 4a and 4a' tends to complicate its manufacturing process. In particular, when opposite surfaces of a printed circuit board are occupied by the two detecting coils 4a and 4a', it becomes difficult or costly to provide other means on the printed circuit board for additional functions.

SUMMARY OF THE INVENTION

Therefore, an object of the present invention is to provide a displacement detector with an improved core, which core has a comparatively uniform distribution of magnetic flux density in its gap. The core in the displacement detector of the invention also solves the above-mentioned shortcomings of the core of the prior art.

In an embodiment of the invention, a core is formed by assembling a first and a second magnetic members. The first magentic member has three legs connected at one end so as to form an E-shaped cross section, and its central leg is shorter than its two side legs. A first coil is wound on the central leg. The second magnetic member extends across extended ends of the two side legs while defining a gap between extended end of the central leg and the second magnetic member. The first coil is an exciting coil for magnetizing the core to produce a magnetic field in the gap.

With the core of the displacement detector of the invention, the first coil may be wound separately and fitted on the central leg of the first magnetic member, so that the winding process of the first coil is made very simple. The core of the invention is not U-shaped, but has a closed loop of magnetic material through the two side legs of the first magnetic member, so that the flux density in the gap is more uniform than that in the conventional U-shaped core. The closed loop of the magnetic material makes the core less susceptible to magnetic influence from the outside than in the case of the U-shaped core. As compared with the conventional U-shaped core, the core of the invention is easier to fabricate because the first and the second magnetic members can be machined separately and assembled easily, and the first coil can be mounted easily as pointed out above.

The gap of the core receives a second coil in such a manner that the second coil and the core are movable relative to each other. Preferably, the second coil is in the form of a coil printed on a printed circuit board. The second coil has a slant portion inclined with respect to direction of relative movement between the core and the second coil. Due to the slant portion, the linkage of magnetic flux between the core and the second coil depends on the relative position therebetween. The second coil is a detecting coil which produces an output voltage proportional to the above magnetic flux linkage and, accordingly, proportional to the relative displacement between the core and the second coil.

Another object of the present invention is to provide a displacement detector with an improved printed circuit board. In another embodiment of the displacement detector of the invention, a core with a gap carries a first coil mounted thereon and a printed circuit board carrying a second coil printed thereon extends through the gap of the core in such a manner that the printed circuit board and the core are movable relative to each other.

To fulfill the last-mentioned object, the second coil has a plurality of turns with slant portions inclined in a symmetrical fashion with respect to a common center line parallel to direction of the relative movement between the core and the printed circuit board. The slant portions of the second coil turns are spaced successively along the center line. The fact that each turn of the second coil has a slant portion which is symmetrical with respect to the center line means that each turn has two slant sections, one slant section on one side of the center line and another slant section on the opposite side of the center line, and such two slant sections are symmetrical. Due to the symmetry with respect to the center line, voltages induced in the two slant sections deviate from linearity in opposite directions, provided that the magnetic field in the gap varies linearly. Thus, the overall voltage in each turn, which is the sum of the two slant section voltages, is substantially linear because the deviations in the two slant sections are cancelled each other.

BRIEF DESCRIPTION OF THE DRAWINGS

Like parts are designated by like numerals and symbols throughout different views of the drawings.

DESCRIPTION OF THE PREFERRED EMBODIMENTS

Figure 1A:
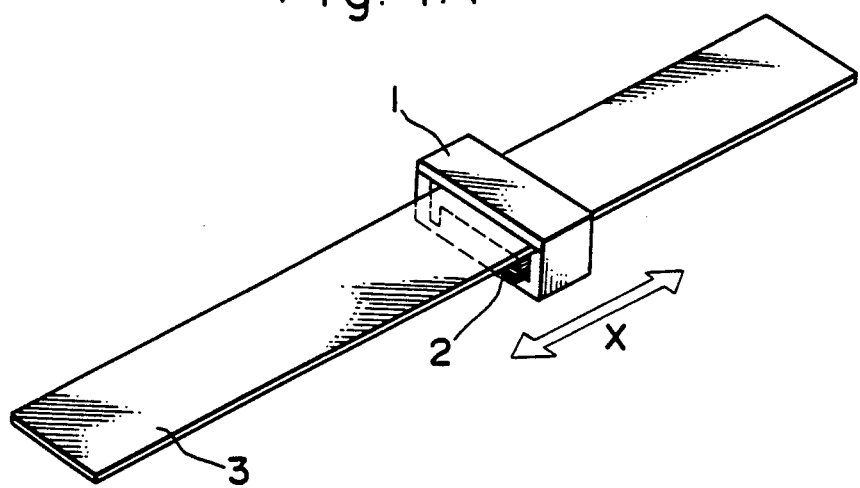
FIG. 1A is a perspective view of an embodiment of the displacement detector according to the invention.
Figure 1B:
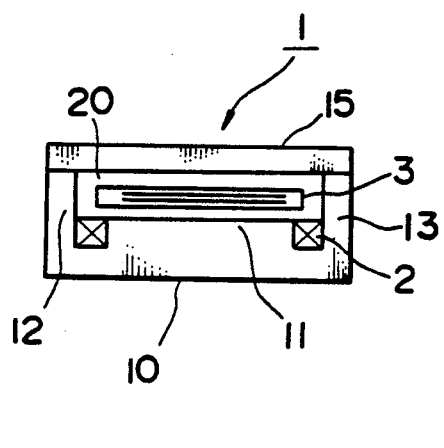
FIG. 1B is a schematic side view of the displacement detector of FIG. 1A.
Figure 1C:
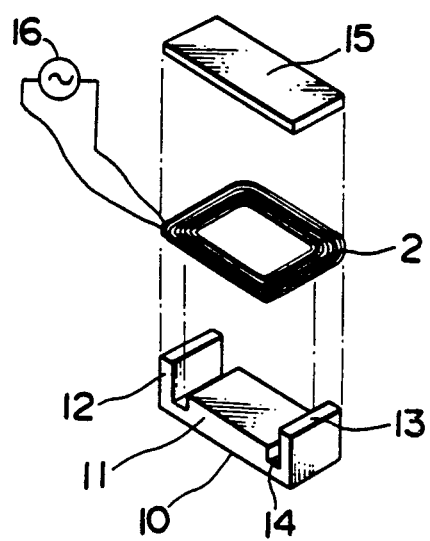
FIG. 1C is an exploded perspective view of a core of the displacement detector of FIG. 1A.

An embodiment of the invention in FIGS. 1A, 1B and 1C uses a core made of an E-shaped first magnetic member 10 with a central leg 11 and side legs 12, 13 and a second magnetic member 15 extending across the side legs 12, 13. The central leg 11 is shorter than the side legs 12, 13, and a gap 20 is formed between the extended end of the central leg 11 and the second magnetic member 15. In the example of FIG. 1B, a first coil or an exciting coil 2 is wound around the central leg 11. A recess 14 may be provided on opposite sides of the central leg 11 for facilitating the formation of the exciting coil 2, which coil 2 may be prepared separately and fitted in the recess 14.

Figure 2:
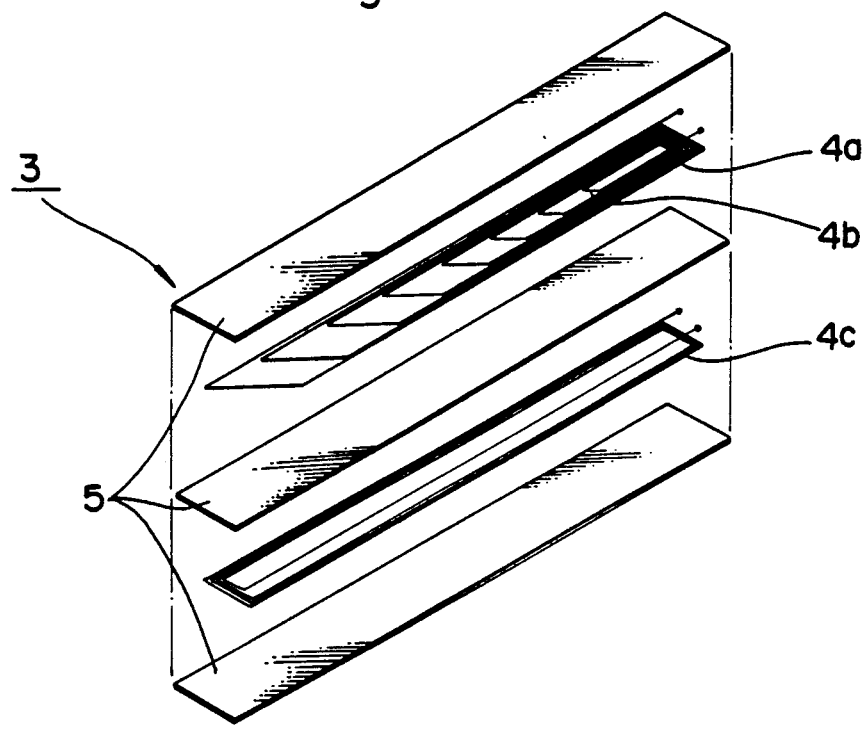
FIG. 2 is an exploded perspective view of a printed circuit board for the displacement detector of FIG. 1A.

A second coil or a detecting coil 4a, preferably in the form of a coil in a printed circuit board 3 as shown in FIG. 2, is disposed on a plane through the gap 20 of the core 1. In the illustrated example, the detecting coil 4a has a number of turns connected in series. As FIG. 2 shows, each turn is of trapezoidal shape having parallel side portions, a bottom side portion perpendicular to the parallel side portions and a slant portion 4b connecting those ends of the parallel side portions which are opposite to the bottom side portion. The parallel side portions of all the turns are held substantially along two parallel lines perpendicular to the reference line. The slant portions 4b of the plural turns of the detecting coil 4a are displaced from turn to turn as shown in FIG. 2. inside area of the coil 4a which falls within the gap 20 (i.e., the intersecting area) varies depending on the relative position between the core 1 and the coil 4a. Thus, the inductance of the detecting coil 4a varies, depending on its position relative to the core 1.

In FIG. 1A, the core 1 is assumed to move in the direction of the arrow X, but the invention is not limited to the movable core 1. The inductance L of the detecting coil 4a can be defined by the following equation.

$$V = L(dI/dt)$$

here, I is a current through the coil 4a and V is a voltage induced in the coil by a change in the current I. When the core 1 intersects with the detecting coil 4a, the voltage V induced in the coil 4a varies depending on the above-mentioned intersecting area, so that the inductance L also varies. Since the detecting coil 4a has at least one slant portion 4b which is inclined relative to the direction of relative movement between the core 1 and the coil 4a, the above-mentioned intersecting area is a function of the displacement of the core 1. Thus, the displacement of the core 1, or the relative displacement between the core 1 and the detecting coil 4a, can be converted into the inductance L of the detecting coil 4a.

When an AC power source 16 is connected to the exciting coil 2 as shown in FIG. 1C, an AC magnetic field intersects with the detecting coil 4a, and the displacement X of the core 1 can be detected as an AC voltage induced in the detecting coil 4a. Hence, the displacement X is converted into the output AC voltage e from the detecting coil 4a.

The use of the E-shaped first magnetic member 10 in the core 1 facilitates the formation or mounting of the exciting coil 2 on the core 1, and the difficulty of the prior art in fabrication of the exciting coil 2 can be solved. As a result, need for a wide gap 20 for mounting the exciting coil 2 is also removed, and it becomes possible to use a narrow gap 20 for increasing the magnetic flux density therein to produce a higher output voltage and to improve the accuracy of displacement detection. Further, the magnetic circuit of the core 1 is closed through the two side legs 12, 13 of the first magnetic member 10 and the second magnetic member 1, and the uniformity of the magnetic field in the gap 20 is improved, so that error due to non-uniformity of the magnetic field in the gap 20 is reduced and adverse effects due to approach of a foreign matter from the outside can be reduced.

FIG. 2 shows a printed circuit board 3 which includes the detecting coil 4a and an auxiliary coil 4c that are separated and protected by three insulating sheets 5. The auxiliary coil 4c may be used to effect various corrections on the output voltage from the detecting coil 4a and to provide a suitable bias thereto.

Figure 3A:
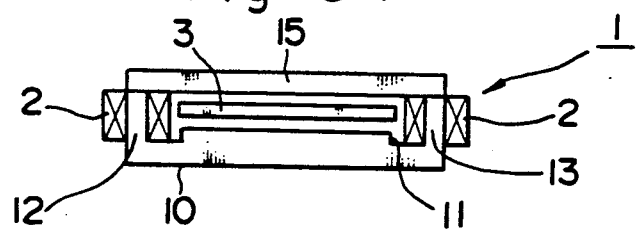
FIGS. 3A, 3B and 3C are explanatory diagrams of different embodiments of the core.
Figure 3B:
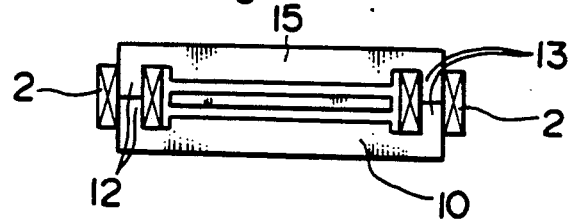
Figure 3C:
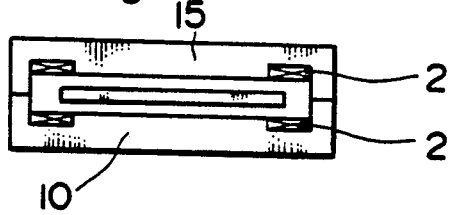
Figure 4A:
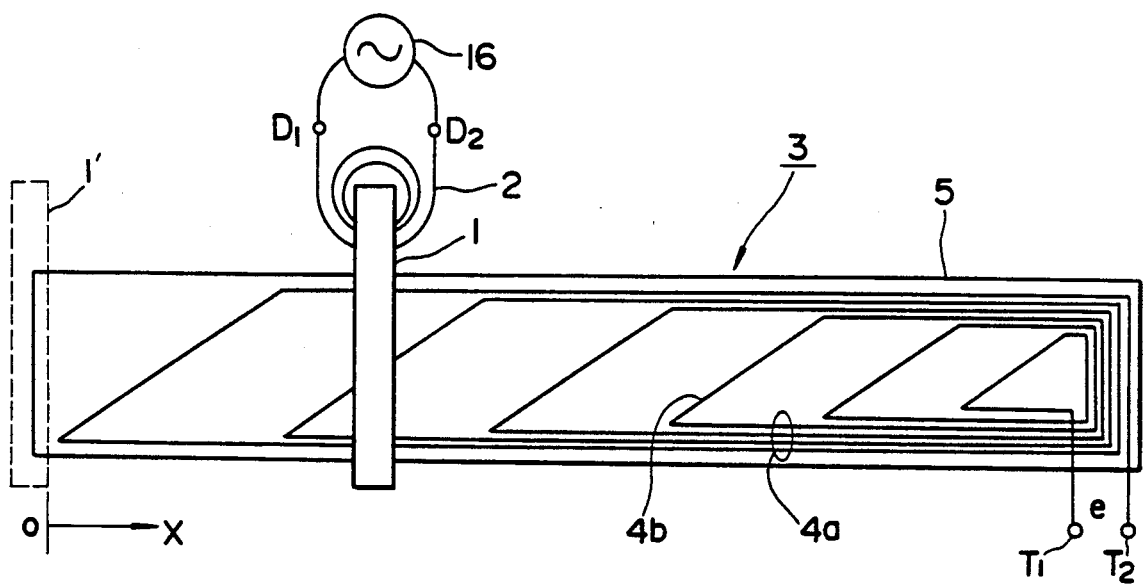
FIGS. 4A and 4B are a plan view and a side view of a conventional displacement detector, respectively.
Figure 4B:
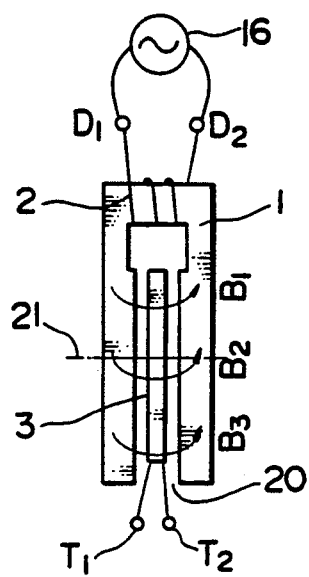
Figure 4C:
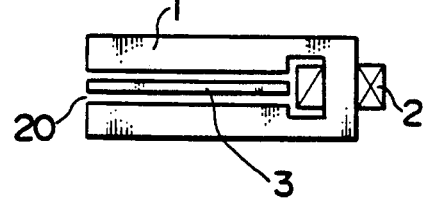
FIGS. 4C and 4D are explanatory diagrams of conventional cores.
Figure 4D:
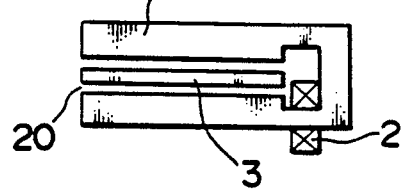

FIG. 3A shows an embodiment of the core 1 which uses two exciting coils 2 wound on the side legs 12 and 13, respectively. In the embodiment of FIG. 3B, the first and second magnetic members 10 and 15 are of identical shape, and after two exciting coils 2 are wound on their side legs 12 and 13, respectively, the two members 10 and 15 are abutted at the extended ends of their side legs. FIG. 3C shows another embodiment in which identical first and second magnetic members 10 and 15 carrying exciting coils 2 wound on their central legs 11 respectively are abutted in a similar manner to the preceding embodiment.

The source for excitation is not restricted to the AC power source 16, and it is possible to replace it with a direct current (DC) power source connected to a suitable switching means. Further, the second coil 4a may be connected to the AC power source 16 for excitation and the first coil 2 may be used for producing a displacement-proportional output voltage.

Figure 6A:
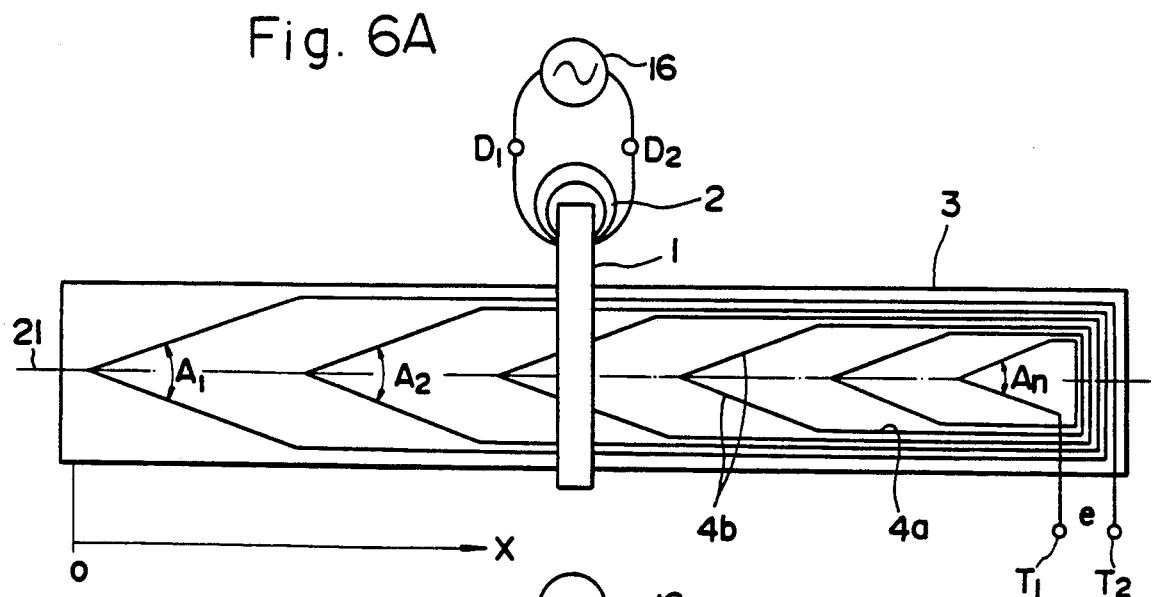
FIGS. 6A and 6B are a plan view and a side view of another embodiment of the displacement detector according to the invention, respectively.
Figure 6B:
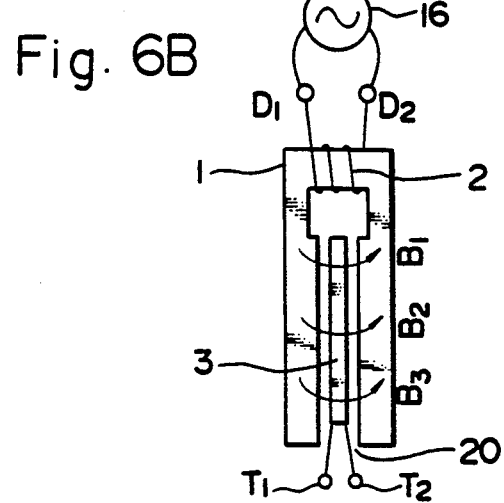

FIGS. 6A and 6B show another embodiment of the displacement detector of the invention in which the linearity of output is improved by using a detecting coil 4a of special shape. The detecting coil 4a of FIG. 6A has a plurality of turns and each turn has a slant portion 4b that is symmetrical with respect to a center line 21, which center line 21 is parallel to the direction of relative displacement X between the core 1 and the printed circuit board 3. To be symmetrical, the slant portion 4b has two sections, one above and one below the center line 21 in FIG. 6A, and such two sections are disposed in symmetry with respect to the center line 21. The slant portions 4b of the detecting coil 4a are spaced in succession along the center lined 21. In the example of FIG. 6A, the core 1 moves along the longitudinal direction of a rectangular printed circuit board 3, and the center line 21 of symmetry substantially coincides with the longitudinal center line of the printed circuit board 3.

It is to be noted that, with the invention, it is sufficient to provide the detecting coil 4a on only one side surface of the printed circuit board 3, and the opposite side surface of the printed circuit board 3 can be used for other purposes.

Figure 5:
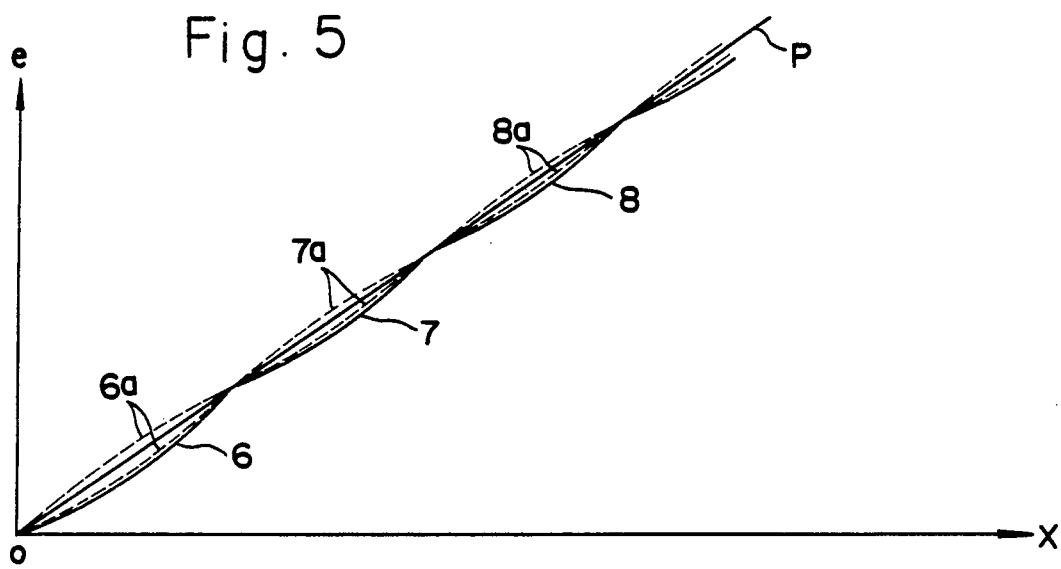
FIG. 5 is a graph of the relationship between displacement X and output voltage e of a displacement detector.

FIG. 5 shows output voltage e of the detecting coil 4a when the core 1 moves from the origin 0 of the coordinate X along the printed circuit board 3 as shown in FIG. 6A. In the beginning of the movement, the flux linkage of the slant portion 4b of the detecting coil 4a at the section above the center line 21 increases from the origin 0 of FIG. 5 along the upper dot line 6a, while the flux linkage at the section below the center line 21 increases along the lower dot line 6a. Thus, the net flux linkage of the slant portion 4b, which is the sum of the two portions shown by the two dot lines 6a, varies linearly because deviations from linearity in the two sections of the slant portion 4b are similar in magnitude and opposite in direction and they cancel each other in the net flux linkage. Accordingly, the output voltage e across the output terminals $T_1$, $T_2$ varies linearly along the solid line OP of FIG. 5, i.e., in proportion to the average of two portions represented by the two dot lines 6a.

In short, linear deviations from uniform flux density distribution within the gap 20 on opposite sides of the center line 21 are cancelled each other by using the flux linkage of the two sections of the slant portion 4b of the detecting coil in the above-mentioned manner, and the output voltage e varies linearly with the displacement X. Thus, non-linear characteristics of the prior art as shown by the curve 6 of FIG. 5 are corrected into the linear characteristics of the solid line OP. Similarly, the conventional characteristics of the non-linear curves 7 and 8 are also corrected into the linear characteristics of the solid line OP by taking averages of the symmetrical dot line characteristics 7a and 8a, respectively.

The problem of non-linear output in the prior art due to non-uniform distribution of flux density in the gap 20 is thus solved by using the detecting coil 4a of the special shape, which coil is formed on only one side of the printed circuit board 3.

The illustrated example of FIG. 6A uses slant portions 4b which are formed with only rectilinear sections in similar patterns having identical vertical angles, i.e., $A_1 = A_2 = \ldots = A_n$. With such identical vertical angles, a linear output voltage e is produced for the displacement X of the core 1. It is also possible to produce a non-linear output voltage e for the displacement X, such as polygonal line characteristics, by varying the vertical angles $A_1, A_2, \ldots, A_n$ from turn to turn in a suitable manner.

The deviation from uniform distribution of the magnetic flux in the gap 20 is assumed to be linear in the above explanation. Even when the deviation is not linear, the output e for the displacement X can be linearized by using curved sections, instead of the rectilinear sections, on opposite sides of the vertical angles $A_1, A_2, \ldots, A_n$ in the slant portions 4b of the detecting coil 4a, while making the shape of the curved section so as to compensate for the variation of the magnetic flux in the gap 20.

Figure 7:
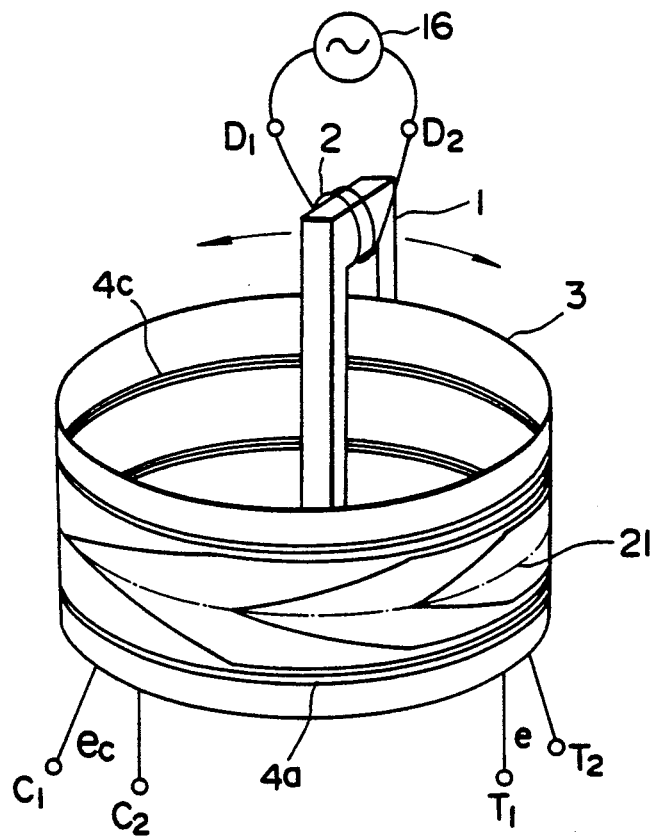
FIG. 7 is a perspective view of an embodiment of the invention using a cylindrical printed circuit board.

FIG. 7 shows another embodiment of the invention, which uses a cylindrical printed circuit board 3. In particular, detecting coils 4a are wound on a flexible circuit board 3 and the flexible board 3 is then applied to sidewall of a cylinder. If the cylindrical printed circuit board 3 is spread flat, it will become the same as that of FIG. 6A. A core 1 with a gap 20, in which the cylindrical printed circuit 3 fits in, moves along a cylindrical plane defined by the printed circuit board 3. An output voltage e corresponding to the angular displacement of the core 1 is produced across output terminals $T_1$, $T_2$ of the detecting coil 4a.

The embodiment of FIG. 7 has a control coil 4c which is formed on the back side of the printed circuit board 3, and a control voltage $e_c$ is produced across control terminals $C_1$ and $C_2$. The control voltage $e_c$ is constant as long as the flux density in the gap 20 remains unchanged, and it is independent of the angular position of the core 1. The purpose of the control coil 4c is to monitor the control voltage $e_c$ for detecting any change in the flux density in the gap 20, for instance due to voltage fluctuation of the AC power source 16 or ambient temperature variation, and to keep the flux density at a constant level by regulating the voltage of the AC power source 16.

Figure 8:
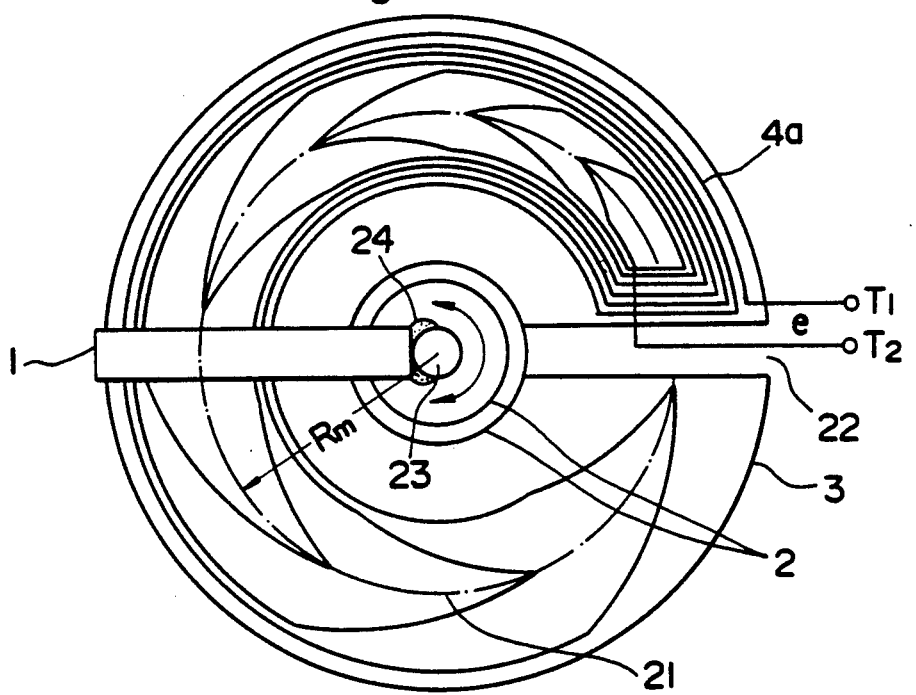
FIG. 8 is a perspective view of an embodiment of the invention using an annular disk type printed circuit board.

FIG. 8 shows another embodiment using a printed circuit board 3 which is of annular disk shape and has a multi-turn detecting coil 4a formed thereon. Each turn of the detecting coil 4a has a slant portion 4b which is symmetrical with respect to a center line 21 that corresponds to a circle with an average radius of the board 3 of annular disk shape. In this example, an exciting coil 2 is also formed on the printed circuit board 3. To facilitate the mounting of a core 1, a slit 22 is provided on the printed circuit board 3. A rotary shaft 23 perpendicularly extends through central portion of the disk shaped printed circuit board 3, and it is rotatably held by a suitable bearing (not shown). The core 1 with a gap 20 is secured to the rotary shaft 23 by an adhesive 24 in such a manner that the core 1 is movable along the circuit board 3 while causing variation in the interlinkage between the magnetic field of the gap 20 and the detecting coil 4a of the board 3. An output voltage e depending on the angular position of the rotary shaft 23 is produced across output terminals $T_1$ and $T_2$ of the printed circuit board 3.

The invention is not limited to the illustrated examples and various modifications are possible within the scope of the invention. For instance, the detecting coil 4a can be formed on an alumina substrate (not shown) by using a thick film technique, although it is convenient to form such coil as an integral part of printed circuit board 3. In the foregoing description, the core 1 is assumed to move along the fixed detecting coil 4a, but relative displacement between the core 1 and the detecting coil 4a is sufficient in the invention, and the detecting coil may be moved relative to the core 1 which is fixed, or both the core 1 and the printed circuit board 3 may be made movable. In the examples of FIGS. 6A, 6B and 7, the core 1 with the exciting coil 2 is movable, so that flexible cord is necessary to connect the AC power source 16 to the exciting terminals $D_1$ and $D_2$ of the exciting coil 2.

The waveform of voltage from the AC power source 16 can be for instance sinusoidal, triangular, or rectangular, but it is not restricted to such shape. From the standpoint of ease of oscillation and rectification of the output voltage, rectangular waveform is most preferable. The inventors have found out that for certain applications, a frequency of about 10 kHz is preferable.

The shape of the core 1 is not restricted to the U-type of FIG. 6B, and the core of FIG. 1B which has a closed magnetic material path surrounding a gap 20 can be used together with the printed circuit board 3 of FIG. 6A having detecting coils 4a with symmetrical slant portions 4b. The closed magnetic material path of the core 1 may be formed by abutting two U-shaped magnetic members at free ends of their legs, instead of the combination of the E-shaped member 10 and the flat member 15 of FIG. 1B. Instead of acute vertical angles $A_1, A_2, \ldots, A_n$ in the embodiments of FIG. 6A through FIG. 8, it is possible to make such vertical angles obtuse so as to make the slant portion 4b into M-shape. Symmetry with respect to the center line 21 is sufficient in the detecting coil 4a of the invention.

Outstanding effects of the present invention can be summarized as follows.

(1) An exciting coil 2 (or a coil for detection) can be easily mounted on a core 1 by using the E-shaped magnetic member 10.

(2) The gap 20 of the core 1 can be made small so as to raise the magnetic flux density therein and accordingly the output voltage induced in the detecting coil 4a.

(3) The magnetic flux density in the gap 20 can be raised easily by increasing the number of turns in the detecting coil 4a, so as to raise the output voltage induced in the detecting coil 4a.

(4) Magnetic flux in the gap 20 can be divided into two parts through two side legs 12, 13 of the E-shaped magnetic member 10, respectively. Hence, the cross sections of such two legs and magnetic members in series therewith can be reduced, as compared with the cross section of the U-shaped core. If the width of the core 1 is kept constant, the thickness of its magnetic members can be reduced.

(5) The gap 20 is surrounded by the magnetic material, so that leakage of the magnetic flux can be minimized and the accuracy of the displacement detection and its conversion into electric signal can be improved.

(6) The closed magnetic circuit around the gap 20 prevents disturbance of the magnetic field therein due to inadvertent approach of a foreign magnetic substance to the proximity of the gap 20.

(7) As compared with the conventional U-shaped core, the closed core of the invention with similar electromagnetic properties is mechanically stronger.

(8) As compared with the conventional U-shaped core, the closed magnetic circuit core of similar electromagnetic properties can be made smaller.

(9) Non-linearity in the output from the displacement detector due to non-uniform magnetic field in the gap 20 can be minimized by using the symmetrical slant portions 4b in the coil which is movable relative to the core.

(10) High linearity of the output from the displacement detector can be ensured by using only one side surface of the printed circuit board 3, and the opposite side surface of printed circuit board 3 can be used for other purposes such as for mounting a control coil to regulate the magnetic flux density in the gap 20 or a coil for improving the sensitivity of the displacement detection.

(11) Even if the magnetic field in the gap 20 varies in a non-linear fashion, linear output may be obtained by modifying the shape of the slant portions 4b of the coil of the preceding paragraph in a suitable manner.

What is claimed is:

1. A displacement detector comprising:
   a core formed of a first magnetic member having a central leg and two side legs, each of said legs including a first end and a second, extended end, said legs being connected together at the first ends so that said core has an E-shaped cross section, the central leg being shorter than the two side legs, and a second magnetic member extending across said extended ends of the two side legs and defining a gap between said extended end of the central leg and the second magnetic member;
   a first coil wound around the central leg of the core; and
   a second coil extending through said gap at right angles to the E-shaped cross section of the first magnetic member, the second coil being movable relative to the core and having turns, each turn having a slant portion inclined with respect to the direction of the relative movement between the core and the second coil, so that when the first coil is energized by an AC current, the magnetic flux linkage between the gap of the core and the second coil varies, depending on the position of the second coil relative to the core, so as to induce a voltage in the second coil which varies so as to indicate the position of the second coil relative to the 2. A displacement detector as set forth in claim 1, wherein said second coil has a plurality of turns connected in series, each of the turns having two parallel side portions, a bottom side portion perpendicular to the parallel side portions, and said slant portion connecting those ends of the parallel side portions which are opposite to the bottom side portion, the bottom side portions of all the turns being held substantially at a reference line of the second coil, the parallel side portions of all the turns being held along two lines perpendicular to the reference line, and the slant portions of different turns of the second coil being displaced from turn to turn.

3. A displacement detector as set forth in claim 1, wherein said second coil is formed on an insulating substrate as a printed circuit board, and an auxiliary coil is formed on the insulating substrate of the printed circuit board, so that the voltage induced in the second coil is modified by changing magnetic flux linkage of the second coil through application of a current to the auxiliary coil which is suitable for modifying the voltage.

* * * * *